United States Patent
Choudhary et al.

(10) Patent No.: US 9,657,552 B2
(45) Date of Patent: May 23, 2017

(54) IN-SITU DOWNHOLE HEATING FOR A TREATMENT IN A WELL

(71) Applicant: Halliburton Energy Services, Inc., Houston, TX (US)

(72) Inventors: Yogesh Kumar Choudhary, Stavanger (NO); Arve Oftedal, Sandnes (NO)

(73) Assignee: Halliburton Energy Services, Inc., Houston, TX (US)

( * ) Notice: Subject to any disclaimer, the term of this patent is extended or adjusted under 35 U.S.C. 154(b) by 176 days.

(21) Appl. No.: 13/928,510

(22) Filed: Jun. 27, 2013

(65) Prior Publication Data

US 2015/0000912 A1    Jan. 1, 2015

(51) Int. Cl.
*E21B 36/00* (2006.01)
*E21B 43/24* (2006.01)
*C09K 8/592* (2006.01)
*C09K 8/68* (2006.01)
*C09K 8/74* (2006.01)

(52) U.S. Cl.
CPC ............ *E21B 36/008* (2013.01); *C09K 8/592* (2013.01); *C09K 8/68* (2013.01); *C09K 8/74* (2013.01); *E21B 43/24* (2013.01)

(58) Field of Classification Search
CPC ................................ C09K 8/528; E21B 36/00
See application file for complete search history.

(56) References Cited

U.S. PATENT DOCUMENTS

| 4,330,037 A | | 5/1982 | Richardson et al. | |
|---|---|---|---|---|
| 4,399,868 A | * | 8/1983 | Richardson et al. | 166/300 |
| 4,454,917 A | * | 6/1984 | Poston | C09K 8/592 |
| | | | | 166/303 |
| 5,183,112 A | * | 2/1993 | Paul et al. | 166/312 |

(Continued)

FOREIGN PATENT DOCUMENTS

WO     2008032067     3/2008

OTHER PUBLICATIONS

International Search Report and Written Opinion dated Jul. 11, 2014 for Application No. PCT/US2014/031547.

(Continued)

*Primary Examiner* — Angela M DiTrani
*Assistant Examiner* — Andrew H Sue-Ako
(74) *Attorney, Agent, or Firm* — Craig W. Roddy; Baker Botts L.L.P.

(57) ABSTRACT

The invention provides methods for treating a portion or treatment zone of a well that include introducing one or more treatment fluids into the well, wherein the one or more treatment fluids include: (i) a first reactant and a second reactant, wherein the first reactant and second reactant are selected for being capable of reacting together in an exothermic chemical reaction, and wherein the first and second reactant are in at least sufficient concentrations in the carrier fluid to generate a theoretical heat of reaction of at least 500 kJ/liter of at least one of the treatment fluids; and (ii) a treatment chemical in at least one of the treatment fluids, wherein the treatment chemical is selected for chemically (Continued)

reacting with a substance of a material in the portion or treatment zone of the well. The exothermic reactants and the treatment chemical can be introduced in a single treatment fluid or in separate treatment fluids.

11 Claims, 8 Drawing Sheets

(56) References Cited

U.S. PATENT DOCUMENTS

| | | | |
|---|---|---|---|
| 5,713,416 | A | 2/1998 | Chatterji et al. |
| 6,153,236 | A | 11/2000 | Wu et al. |
| 6,886,406 | B1* | 5/2005 | Couet et al. .................... 73/579 |
| 7,624,743 | B2 | 12/2009 | Sarkar et al. |
| 7,779,683 | B2 | 8/2010 | Glasbergen et al. |
| 2003/0225521 | A1* | 12/2003 | Panga .................... E21B 43/25 702/6 |
| 2004/0214728 | A1 | 10/2004 | Taylor et al. |
| 2011/0114323 | A1 | 5/2011 | Jennings et al. |
| 2012/0067576 | A1 | 3/2012 | Reyes et al. |
| 2012/0097392 | A1 | 4/2012 | Reyes et al. |

OTHER PUBLICATIONS

Josue Villesca, Gerard Glasbergen, David Attaway, "Measuring Fluid Placement of Sand-Consolidation Treatments Using DTS," SPE 144432, SPE European Formation Damage Conference, Noordwijk, The Netherlands, Jun. 7-10, 2011, 8 pages.
International Preliminary Report on Patentability issued in related PCT Application No. PCT/US2014/031547 mailed Jan. 7, 2016 (13 pages).
Al-Harthy et al., "Options for High-Temperature Well Stimulation," Oilfield Review, Winter 2008/2009 (11 pages).
Huang et al., "Carbonate Matrix Acidizing Fluids at High Temperatures: Acetic Acid, Chelating Agents or Long-Chained Carboxylic Acids?", SPE 82268 (2003) (8 pages).
Kelland, Malcolm A., "Production Chemicals for the Oil and Gas Industry," 2nd ed. (2014) (5 pages).

* cited by examiner

IN-SITU DOWNHOLE HEATING FOR A TREATMENT IN A WELL

CROSS-REFERENCE TO RELATED APPLICATIONS

Not applicable.

TECHNICAL FIELD

The inventions are in the field of producing crude oil or natural gas from subterranean formations. More specifically, the inventions generally relate to methods for in situ heating in a well to increase the rate of reaction between chemicals and efficiency of a chemical treatment.

BACKGROUND

It is often required to pre-heat a treatment fluid for use in a well for achieving a higher reaction rate during various operations.

In general, the rate of a chemical reaction increases with increasing temperature. The Arrhenius equation (Equation 1) describes the temperature dependence of reaction kinetics. The Arrhenius equation gives the dependence of the rate constant K of a chemical reaction on the absolute temperature T in Kelvin, where A is a pre-exponential factor, Ea is the activation energy, and R is the universal gas constant:

$$K = Ae^{-Ea/(RT)} \quad \text{Eq. (1)}$$

For example, the rate of a chemical treatment for removing barium sulfate scale (mass) is a function of temperature and time. At less than about 77° F. (25° C.), the reaction rate is very slow and increasing the contact time only very gradually increases the amount of chemically removed scale. For example, at 68° F. (20° C.) after about 24 hours total contact time, the amount of dissolved barium ion of a scale is only about 8,000 ppm. However, at a higher temperature greater than about 77° F. (25° C.), the reaction rate increases and the amount of dissolved barium ion increase linearly with time after an initial contact period of about 3 hours. At 86° F. (30° C.) after about 24 hours total contact time, the amount of dissolved barium ion of the scale is about 25,000 ppm. At 185° F. (85° C.) after about 24 hours total contact time, the amount of dissolved barium ion of the scale is about 80,000 ppm. In general, for chemical removal of an inorganic scale such as barium sulfate, a higher temperature or longer contact time is required for effectiveness of the job.

Similarly, chelant-based matrix stimulation generally requires a temperature greater than about 250° F. (120° C.) for better results. Well operators are trying to use chelant-based systems instead of conventional acidizing systems because these fluid systems reduce the handling risks usually associated with conventional acids. However, their applicability is generally limited to naturally high temperature wells because of the reaction kinetics.

Conventionally, a treatment fluid can be pre-heated at the well site and pumped downhole for a specific purpose. The purpose of the pre-heating is to provide a higher temperature and reaction rate downhole. Unfortunately, as a pre-heated treatment fluid is pumped down the wellbore, heat energy may be lost to the wellbore surroundings and the fluid may become cooled.

In this situation, a higher pumping rate is required to reduce the heat loss and fluid cooling so that the temperature of the fluid will be higher when it reaches the desired treatment zone. FIG. 1 is an example of fluid heat loss as a function of pumping rate. More particularly, FIG. 1 shows a WELLCAT™ temperature simulation of an estimated temperature profile for 40 $m^3$ volume of an aqueous fluid pre-heated to about 158° F. (70° C.) against true vertical depth (TVD) in meter for an exemplary vertical wellbore in a cold environment having a 24 inch surface casing to 500 meters TVD and a 7 inch producing tubing string to 600 meters TVD as a function of pumping rate in liters/minute (lpm). In the example of FIG. 1, if the pumping rate is less than 2 barrels/minute (bpm) (a barrel of oil contains 159.6 liters), then the fluid cools down significantly by the time it reaches the desired depth. If the pumping rate is greater than about 2 bpm, the fluid still cools down but there is slightly less heat loss compared to a lower pumping rate and a higher temperature at depth is obtained as can be seen from FIG. 1.

Unfortunately, a higher pumping rate presents another problem. In general, the higher the pumping rate, the shorter the contact time for the fluid in a portion of a well. The contact time can be calculated using Equation 2, where $t_{contact}$ is fluid contact time, $V_{treatment}$ is the volume of the treatment fluid, and Q is the pumping rate, such that the time of fluid contact is an inverse function (f) of the pumping rate.

$$t_{contact} = \frac{V_{treatment}}{Q} = f\left(\frac{1}{Q}\right) \quad \text{Eq. (2)}$$

Therefore, if the pumping rate is too high, even if the temperature is sufficient, the contact time may be too short for an effective treatment. In addition, sometimes it is not possible to pump a treatment fluid at a sufficiently high rate to maintain an adequate fluid temperature due to surface or bottomhole pressure limitations.

Also, the costs of pre-heating a treatment fluid are high. On an offshore platform, it may require brining in specialized boats or equipment for such operations. Therefore, there are major limitations to methods requiring a pre-heated treatment fluid that reduce the usefulness of such treatments.

SUMMARY OF THE INVENTION

This invention provides methods for in-situ heating of a treatment fluid for various downhole applications in a well, such as chelant based matrix stimulation or inorganic scale removal.

The invention provides methods for treating a portion or treatment zone of a well that include introducing one or more treatment fluids into the well, wherein the one or more treatment fluids include: (i) a first reactant and a second reactant, wherein the first reactant and second reactant are selected for being capable of reacting together in an exothermic chemical reaction, and wherein the first and second reactant are in at least sufficient concentrations in the carrier fluid to generate a theoretical heat of reaction of at least 500 kJ/liter of at least one of the treatment fluids; and (ii) a treatment chemical in at least one of the treatment fluids, wherein the treatment chemical is selected for chemically reacting with a substance of a material in the portion or treatment zone of the well. The exothermic reactants and the treatment chemical can be introduced in a single treatment fluid or in separate treatment fluids.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the scope of the invention as expressed in the appended claims.

BRIEF DESCRIPTION OF THE DRAWING

The accompanying drawing is incorporated into the specification to help illustrate examples according to the presently most-preferred embodiment of the invention. It should be understood that the figures of the drawing are not necessarily to scale.

DETAILED DESCRIPTION OF PRESENTLY PREFERRED EMBODIMENTS AND BEST MODE

Definitions and Usages

General Interpretation

Figure 1:
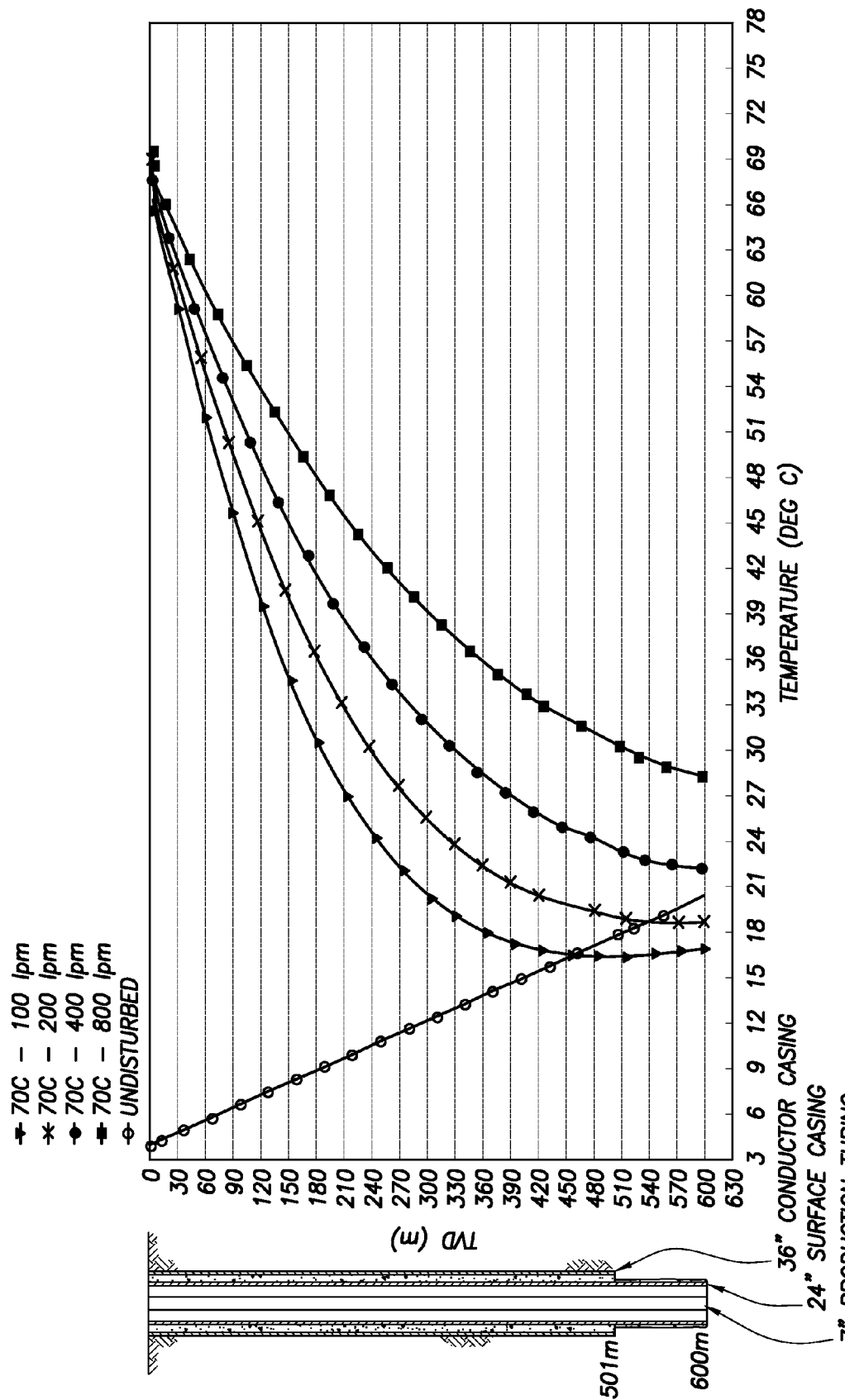
FIG. 1 shows a WELLCAT™ temperature simulation of an estimated temperature profile for 40 $m^3$ volume of an aqueous fluid pre-heated to about 158° F. (70° C.) against true vertical depth (TVD) in meter for an exemplary vertical wellbore in a cold environment having a 24 inch surface casing to 500 meters TVD and a 7 inch producing tubing string to 600 meters TVD as a function of pumping rate in liters/minute (lpm)

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

The control or controlling of a condition includes any one or more of maintaining, applying, or varying of the condition. For example, controlling the temperature of a substance can include heating, cooling, or thermally insulating the substance.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a reservoir.

A subterranean formation containing oil or gas may be located under land or under the seabed offshore. Oil and gas reservoirs are typically located in the range of a few hundred feet (shallow reservoirs) to a few tens of thousands of feet (ultra-deep reservoirs) below the surface of the land or seabed.

Carbonate, Sandstone, and Other Rocks

In geology, rock or stone is a naturally occurring solid aggregate of minerals or mineraloids. The Earth's outer solid layer, the lithosphere, is made of rock. Three major groups of rocks are igneous, sedimentary, and metamorphic. The vast majority of reservoir rocks are sedimentary rocks, but highly fractured igneous and metamorphic rocks can sometimes be reservoirs.

As used herein, a subterranean formation having greater than about 50% by weight of inorganic carbonate materials is referred to as a "carbonate formation." For matrix acidizing techniques in a carbonate formation, the carbonate formation preferably is greater than about 80% by weight of inorganic carbonate materials. For example, limestone is essentially calcium carbonate. Dolomite is essentially a combination of calcium carbonate and magnesium carbonate, wherein at least 50% of the cations are magnesium.

As used herein, a subterranean formation having greater than about 50% by weight of inorganic siliceous materials (e.g., sandstone) is referred to as a "sandstone formation."

Well Servicing and Fluids

To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Drilling, completion, and intervention operations can include various types of treatments that are commonly performed on a well or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a fluid pits, separators, compressor stations, heating, or other equipment. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, and a tubing string.

As used herein, a "fluid" broadly refers to any fluid adapted to be introduced into a well for any purpose. A fluid can be, for example, a drilling fluid, a setting composition, a treatment fluid, or a spacer fluid. If a fluid is to be used in a relatively small volume, for example less than about 100 barrels (about 4,200 US gallons or about 16 m$^3$), it is sometimes referred to as a slug, pill, wash, or dump.

As used herein, the word "treatment" refers to any treatment for changing a condition of a portion of a wellbore, or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

As used herein, the term "carrier fluid" refers to a fluid for dissolving, suspending, or otherwise carrying another substance or material. For example, a treatment fluid can be formed by mixing a carrier fluid with another substance or material selected for being chemically active in a portion of a well. A carrier fluid is or includes the continuous phase of a treatment fluid.

In the context of a well or wellbore, a "portion" or "interval" refers to any downhole portion or interval along a length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

As used herein, a "downhole" fluid is an in-situ fluid in a well, which may be the same as a fluid at the time it is introduced, or a fluid mixed with another fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

Deviated wells are wellbores inclined at various angles to the vertical. Complex wells include inclined wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Substances, Physical States, Phases, and Chemical Reactions

A substance can be a pure chemical or a mixture of two or more different chemicals.

The common physical states of matter include solid, liquid, and gas. As used herein, "phase" is used to refer to a substance having a chemical composition and physical state that is distinguishable from an adjacent phase of a substance having a different chemical composition or a different physical state.

The word "material" refers to the substance, constituted of one or more phases, of a physical entity or object. Rock, water, air, metal, cement slurry, sand, and wood are all examples of materials.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

A chemical reaction is a process that leads to the transformation of one set of chemical substances to another. Chemical reactions encompass forming and breaking of chemical bonds between atoms (with no change to the nuclei), which are usually described by a chemical equation. For example, reacting barium sulfate with sodium hydroxide or a chelating agent is an example of a chemical reaction, whereas merely dissolving NaCl in water is not.

Hydratability or Solubility

As referred to herein, "hydratable" means capable of being hydrated by contacting the hydratable agent with water. Regarding a hydratable agent that includes a polymer, this means, among other things, to associate sites on the polymer with water molecules and to unravel and extend the polymer chain in the water.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

The "source" of a chemical species in a solution or in a fluid composition can be a material or substance that is itself the chemical species, or that makes the chemical species chemically available immediately, or it can be a material or substance that gradually or later releases or forms the chemical species to become chemically available in the solution or the fluid.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

In contrast, an "oil-based" fluid means that oil is the dominant material by weight of the continuous phase of the fluid. In this context, the oil of an oil-based fluid can be any oil.

In the context of a fluid, oil is understood to refer to any kind of oil in a liquid state, whereas gas is understood to refer to a physical state of a substance, in contrast to a liquid. In this context, an oil is any substance that is liquid under Standard Laboratory Conditions, is hydrophobic, and soluble in organic solvents. Oils typically have a high carbon and hydrogen content and are non-polar substances. This general definition includes classes such as petrochemical oils, vegetable oils, and many organic solvents. All oils, even synthetic oils, can be traced back to organic sources.

General Measurement Terms

The barrel (bbl) is the unit of measure used in the US oil industry, wherein one barrel equals 42 U.S. gallons. Standards bodies such as the American Petroleum Institute (API) have adopted the convention that if oil is measured in oil barrels, it will be at 14.696 psi and 60° F., whereas if it is measured in cubic meters, it will be at 101.325 kPa and 15° C. (or in some cases 20° C.). The pressures are the same but the temperatures are different—60° F. is 15.56° C., 15° C. is 59° F., and 20° C. is 68° F. However, if all that is needed is to convert a volume in barrels to a volume in cubic meters without compensating for temperature differences, then 1 bbl equals 0.159 $m^3$ or 42 U.S. gallons.

Unless otherwise specified, mesh sizes are in U.S. Standard Mesh.

In-Situ Heating for a Chemical Reaction of a Downhole Treatment

Instead of or in addition to heating a treatment fluid at the wellhead, a method according to the present invention is to use chemical reactants to provide in-situ downhole heating as close to the treatment zone as possible to limit the heat losses to the surroundings during pumping from the surface to the treatment zone. This can be accomplished by using an exothermic reaction downhole, for example, as a "thermal pill" before or after another treatment fluid. An exothermic reaction can be used as part of a treatment fluid.

In order to achieve in-situ heating, exothermic chemical reactants can be pumped along with a treatment fluid. Exothermic chemical reactants are composed of at least two chemicals that react to generate significant heat. The generated heat can be used for in-situ heating, either as part of a treatment fluid or an adjacent treatment fluid (through convection heat transfer between fluids). The exothermic reaction time can be controlled depending on the job requirements. The treatment procedure is to pump the exothermic chemical reactants to increase the temperature of a fluid downhole for improved treatment performance by other desired chemical reactions.

This invention provides in-situ heating of a treatment fluid and being able to pump slowly and at the same time provide a higher temperature downhole. In-situ downhole heating can allow one or more treatment fluids to be pumped at any rate depending upon the equipment capability with less concern for fluid heat losses during pumping from the wellhead to the treatment zone. The methods or embodiments according to the invention overcome the limitations of heating a treatment fluid at the surface of a well and then pumping downhole. For example, the methods according to the invention can allow for reducing the treatment volume compared to optimizing a pre-heated treatment. The methodology can enhance the efficiency of the treatment fluid and provide a more effective treatment.

In an offshore well, the methods also provide for the flexibility to perform a treatment operation from the offshore platform and avoid the need for having a boat with specialized heating equipment used in heating a treatment fluid for the treatment operation.

Various treatments according to the invention are contemplated. In an embodiment, a thermal pill can be pumped as a pre-flush fluid, that is, as a treatment ahead of a different treatment fluid, such as a fluid for removing an inorganic scale. In another embodiment, thermal pills can be pumped in alternating stages with another treatment fluid, such as a scale removal fluid. In yet another embodiment, the exothermic reaction is part of a treatment fluid, such as part of a scale removal fluid, as an internal heating of the treatment fluid.

The invention provides methods for treating a portion or treatment zone of a well that include introducing one or more treatment fluids into the well, wherein the one or more treatment fluids include: (i) a first reactant and a second reactant, wherein the first reactant and second reactant are selected for being capable of reacting together in an exothermic chemical reaction, and wherein the first and second reactant are in at least sufficient concentrations in the carrier fluid to generate a theoretical heat of reaction of at least 500 kJ/liter of at least one of the treatment fluids; and (ii) a treatment chemical in at least one of the treatment fluids, wherein the treatment chemical is selected for chemically reacting with a substance of a material in the portion or treatment zone of the well.

It should be understood that the first and second reactants are for imparting heating to the portion or treatment zone or another treatment fluid in the well.

In an embodiment, a method for treating a portion or treatment zone of a well is provided, the method comprising the steps of: (A) forming a treatment fluid comprising: (i) a carrier fluid; and (ii) a first reactant and a second reactant, wherein the first reactant and second reactant are selected for being capable of reacting together in an exothermic chemical reaction, and wherein the first and second reactant are in at least sufficient concentrations in the carrier fluid to generate a theoretical heat of reaction of at least 500 kJ/liter of the treatment fluid; and (iii) a treatment chemical selected for chemically reacting with a substance of a material in the portion or treatment zone of the well; and (B) introducing the first treatment fluid and the second treatment fluid in any sequential order into the portion or treatment zone of the well. Preferably, the volume of the treatment fluid is equal to or greater than about 10 $m^3$. In some applications, the volume of the treatment fluid is greater than about 16 $m^3$, that is, larger than a single pill.

Preferably and in a further embodiment, the contact time of the treatment fluid with the portion or treatment zone of the well is controlled to be shorter than would be required for an otherwise similar treatment fluid without the first and second reactants.

Preferably and in a further embodiment, the first and second reactant are in at least sufficient concentrations in the carrier fluid to generate a theoretical heat of reaction of at least 1,000 kJ/liter of the treatment fluid.

In another embodiment, a method for treating a portion or treatment zone of a well is provided, the method comprising the steps of: (A) forming a first treatment fluid comprising: (i) a first carrier fluid; and (ii) a first reactant and a second reactant, wherein the first reactant and second reactant are selected for being capable of reacting together in an exothermic chemical reaction, and wherein the first and second reactant are in at least sufficient concentrations in the carrier fluid to generate a theoretical heat of reaction of at least 500 kJ/liter of the treatment fluid; wherein the volume of the first treatment fluid is equal to or greater than about 10 $m^3$; (B) forming a second treatment fluid comprising: (i) a second carrier fluid; and (ii) a treatment chemical selected for chemically reacting with a substance of a material in the portion or treatment zone of the well; and (C) introducing the first treatment fluid and the second treatment fluid in any sequential order into the portion or treatment zone of the well.

Preferably and in a further embodiment, the contact time of the first and second treatment fluids with the portion or treatment zone of the well is controlled to be shorter than would be required for an otherwise treatment without the first fluid.

Preferably and in a further embodiment, the first and second reactant are in at least sufficient concentrations in the carrier fluid to generate a theoretical heat of reaction of at least 1,000 kJ/liter of the treatment fluid.

Preferably, the first and second treatment fluids are introduced adjacent to each other without an intermediate treatment fluid between the first and second treatment fluids. The first treatment fluid and the second treatment fluid can be alternatingly introduced into the well. In some applications, the total volume of the first treatment fluid is greater than about 16 m$^3$, that is, larger than a single pill.

An example of a treatment method (assuming, for example, a total of 50 m$^3$ of heating and other treatment fluids) can include the steps of: (1) pumping a heating fluid comprising exothermic chemical reactants (a heat generating fluid) of a certain volume; (2) pumping a treatment fluid of 10 m$^3$; (3) pumping a heating fluid comprising exothermic chemical reactants (a heat generating fluid) of a certain volume; (4) pump treatment fluid of 10 m$^3$; (5) repeating step 1 and 2 until all the treatment fluid is pumped into the well.

The invention provides a new method for in-situ heating of the alternating stages of treatment fluid for miscellaneous treatments. The advantages of this method include:

(a) minimizing the cooling effect as the fluid is pumped downhole; (b) increased contact time at a desired temperature compared to using a pre-heated treatment fluid, and hence increasing effectiveness of the fluid; and (c) less footprint of equipment, which is especially valuable for offshore wells.

In-Situ Heating for Removing Inorganic Scale with Acid

Certain types of inorganic scale can be attacked and removed with acid solutions. For example, iron oxide scales, iron sulfide scales, or zinc sulfide scales are commonly removed using strong HCl solution (for example, about 15% HCl). For example, iron oxides or iron sulfides react with hydrochloric acid to produce soluble iron chlorides. In general, the rate of chemical reactions increases with increasing temperature.

With the help of in-situ heating according to the invention, the temperature of a treatment zone can be raised temporarily, thereby increasing the reaction rate and reducing the required contact time to remove such scales with a hydrochloric acid solution.

In-Situ Heating for Treatment with a Chelating Agent

Chelant-based fluid systems for stimulation usually require temperatures greater than 220° F. (104° C.) for better results. This is because, at lower temperatures the reaction rate is slow and require longer shut-in times (that is, greater than about 1 hour) for effective treatment. Longer shut-in periods have several disadvantages such as: (a) wait time during shut-in can cause lot of money to the customer from reduced production; (b) shutting-in the well reduces the chances to flow back the well naturally and might require nitrogen lifting to start the well; (c) issues with fines getting generated and being adsorbed into the formation which could cause formation damage; and (d) precipitation of a mineral, such as iron.

With the help of in-situ heating according to the invention, the temperature of a treatment zone can be raised temporarily.

Due to increased rate of reaction, the shut-in can be avoided which would help in overcoming the issues described above. The in-situ heating chemicals (that is, exothermic chemical reactants) can be added or mixed with the treatment fluid itself for improved performance. The particular thermal reactants are selected for being compatible with the particular chelant based fluid system.

These methods can be adapted for matrix or fracture treatments using chelating agents. Examples include chelating agents for increasing permeability in carbonate formations. Other examples include chelating to remove scale or other damage.

The invention offers one or more benefits for chelant-based treatments, such as allowing for a wider applicability of chelant-based matrix stimulation treatment.

In-Situ Heating for Scale Removing Treatment for a Downhole Safety Valve

Downhole safety valves (DHSV) are installed downhole in the upper completion in the North Sea and other areas to have an extra barrier during emergencies. Regulations in the North Sea say that the DHSV should always be functional, and if it is not the well may no longer be on production. Scaling of the DHSV is a safety concern and the DHSV has to be tested at regular intervals. In many oil fields there is a potential for the formation of inorganic scale that is acid insoluble (for example, $BaSO_4$ and $SrSO_4$). Due to the non-reactiveness of the scale, it is very hard to remove chemically.

A first line of defense is pumping preventive scale inhibitor treatments either constantly from injection line downhole or soaking the reservoir with a slow releasing scale inhibitor that is released during production. With high scaling potential and high water production, however, this might not be sufficient and the DHSV could still have a scaling problem.

A second line of defense is removing the scale chemically. The less expensive solution is pumping the treatment from installation. Deck space on installations is however limited and constricts the amount of treatment chemicals that could be used and a vessel is often rented to transport and pump the chemicals. Having more equipment space available on a vessel there is also a possibility of on-the-fly treatment heating by using a steam generator and heat exchangers to increase the success of the treatments.

A third line of defense is renting a rig to go in and remove the scale mechanically using well intervention tools. At this point, the DHSV has become fully scaled and the well has to be shut-in for a long time for such an intervention.

A fourth line of defense is setting an insert a new DHSV into the existing one; however, this restricts the flow path through the previously existing DHSV.

The economics involved for the third and fourth line of defense are considerable. Both alternatives involve expensive rental of rig and delayed or lost production. Among other applications, a method according to this invention can address the second line of defense and improve a scale removal treatment for a DHSV, especially in a portion of a well that is at a cool temperature.

Chemical treatments with chelating agents for barium sulfate scale removal from a DHSV generally require higher temperatures of greater than about 77° F. (25° C.) or longer times to be effective, so such treatments have been limited to zones having such a naturally warmer BHST. For example, at 68° F. (20° C.) after about 24 hours total contact time, the amount of dissolved barium ion of a scale is only about 8,000 ppm. However, at a higher temperature greater than about 77° F. (25° C.), the reaction rate increases and the amount of dissolved barium ion increase linearly with time after an initial contact period of about 3 hours. At 86° F. (30° C.) after about 24 hours total contact time, the amount of dissolved barium ion of the scale is about 25,000 ppm.

According to the invention, in-situ heating of the treatment fluid would greatly extend the use of such chemical treatments, especially in situations where pre-heating the treatment fluid is costly or not feasible.

In-Situ Heating for Matrix Chelating Treatments Instead of Conventional Acidizing Acidizing is commonly performed in carbonate and sandstone formations, however, the different types of formations can require that the particular treatments fluids and associated methods be quite different.

For example, sandstone formations tend to be relatively uniform in composition and matrix permeability. In sandstone, a range of stimulation techniques can be applied with a high degree of confidence to create conductive flow paths, primarily with hydraulic fracturing techniques, as known in the field.

In sandstone formations, acidizing primarily removes or dissolves acid soluble damage in the near-wellbore region. Therefore, in sandstone formations acidizing is classically considered a damage removal technique and not a stimulation technique. The use of specialized hydrofluoric acid compositions, however, can dissolve the siliceous material of sandstone.

Carbonate formations tend to have complex porosity and permeability variations with irregular fluid flow paths. Many of the treatment methods for sandstone formations can also be applied in carbonate formations.

In carbonate formations, the goal is usually to have the acid dissolve the carbonate rock to form highly-conductive fluid flow channels in the formation rock. These highly-conductive channels are called wormholes. In acidizing a carbonate formation, calcium and magnesium carbonates of the rock can be dissolved with acid. A reaction between an acid and the minerals calcite ($CaCO_3$) or dolomite ($CaMg(CO_3)_2$) can enhance the fluid flow properties of the rock.

In carbonate reservoirs, hydrochloric acid (HCl) is the most commonly applied stimulation fluid. Organic acids such as formic or acetic acid are used mainly as retarded-acid systems or in high-temperature applications. Stimulation of carbonate formations usually does not involve hydrofluoric acid, however, which is difficult to handle and commonly only used where necessary, such as in acidizing sandstone formations.

Chelating agents can be used, for example, in stimulation fluids designed for matrix acidizing applications. Chelating fluids facilitate treatment of carbonate or sandstone formations, but can avoid the use of strong acids, which can be difficult to handle and pose environmental concerns. In addition, such chelating agents can be used in formations considered to be susceptible to damage by strong acid, such as HCl acid. Acid-sensitive formations include, for example, heterogeneous formations (such as mixed carbonate and sandstone) that are incompatible with HCl-acid fluids because they can lead to the dissolution of clay minerals, if present, and can cause silica precipitation. However, using such a chelating agent in carbonate acidizing treatments is recommended for temperatures in excess of 220° F. (104° C.). Such a chelating treatment can be used in sandstone acidizing treatments to remove acid-soluble scale, such as carbonates. If clay minerals, aluminosilicate, or silica fines need to be removed, the use of HF acid is required.

Biodegradable chelating agents are preferred for use in treating a well. For example, US Patent Publication No. 20120097392 discloses treatment fluids containing biodegradable chelating agents and methods for use thereof are described. The methods can comprise providing a treatment fluid that comprises an aqueous base fluid and a chelating agent composition, and introducing the treatment fluid into at least a portion of a subterranean formation. The treatment fluids can also be used for treatment of pipes or tubing such as, for example, well bore pipes or tubing penetrating a subterranean formation and above-ground pipelines. Illustrative biodegradable chelating agents include, but are not limited to, glutamic acid diacetic acid, methylglycine diacetic acid, β-alanine diacetic acid, S,S-ethylenediaminedisuccinic acid, iminodisuccinic acid, hydroxyiminodisuccinic acid, any salt thereof, any derivative thereof, and any combination thereof. The treatment fluids can optionally comprise an acid, which can include hydrofluoric acid or a hydrofluoric acid generating compound. US Patent Publication No. 20120097392 is incorporated by reference in its entirety.

A biodegradable chelating agent can be selected from the group consisting of: glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-methyliminodiacetic acid, iminodiacetic acid, N-(2-acetamido)iminodiacetic acid, hydroxymethyl-iminodiacetic acid, 2-(2-carboxyethylamino)succinic acid, 2-(2-carboxymethylamino) succinic acid, diethylenetriamine-N,N"-disuccinic acid, triethylenetetramine-N,N'"-disuccinic acid, 1,6-hexamethylenediamine-N,N'-disuccinic acid, tetraethylenepentamine-N,N""-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof.

However, chelating treatments generally require higher temperatures of greater than of 220° F. (104° C.) or longer times to be effective, so such treatments have been limited to zones having such a naturally high BHST.

According to the invention, in-situ heating of the treatment fluid for chelating in cooler zones would greatly extend the use of such chelating treatments, especially in situations where pre-heating the treatment fluid is costly or not feasible.

In-Situ Heating for Other Chemical Reactions in Downhole Treatments

As will be appreciated by a person of skill in the art, the methods according to the invention can be applied to other treatments in a well that would proceed more effectively and timely at higher temperature than can be attained by pumping a pre-heated fluid into a well.

For example, in an embodiment, the desired downhole treatment can involve the use of a thermosetting resin. In another embodiment, the desired downhole treatment can involve breaking the viscosity imparted by a gelling agent, which with in-situ heating can be accelerated, thereby saving time and costs in the treatment.

According to the invention, in-situ heating of a treatment fluid that requires a higher temperature would greatly extend the use of any such treatment, especially in situations where pre-heating the treatment fluid is costly or not feasible.

Examples of Highly Exothermic Reactions and Controlled Heating

Various exothermic reactants and techniques that may be adapted for use in this invention are disclosed in U.S. Pat. No. 7,624,743 entitled "Methods and Compositions for Thermally Treating a Conduit Used for Hydrocarbon Production or Transmission to Help Remove Paraffin Wax Buildup" having inventors Stephen T. Arrington; Ronald J. Powell; Ian D. Robb, Diptabhas Sarkar, and Bradley L. Todd, which is assigned to Halliburton Energy Services, Inc. Although its methods and purposes are different from the present invention, U.S. Pat. No. 7,624,742 is incorporated by reference in its entirety.

The present invention provides methods for treating a portion or treatment zone of a well that include introducing one or more treatment fluids into the well, wherein the one or more treatment fluids include: (i) a first reactant and a second reactant, wherein the first reactant and second reactant are selected for being capable of reacting together in an exothermic chemical reaction, and wherein the first and second reactant are in at least sufficient concentrations in the carrier fluid to generate a theoretical heat of reaction of at least 500 kJ/liter of at least one of the treatment fluids; and (ii) a treatment chemical in at least one of the treatment fluids, wherein the treatment chemical is selected for chemically reacting with a substance of a material in the portion or treatment zone of the well.

Preferably, the first and second reactant are in at least sufficient concentrations in the carrier fluid to generate a theoretical heat of reaction of at least 500 kJ/liter of the treatment fluid. More preferably, the reactants and concentrations are selected to generate a theoretical heat of reaction of at least 1,000 kJ/liter of the treatment fluid. In some embodiments, the reactants and concentrations are selected to generate a theoretical heat of reaction of at least 1,500 kJ/liter of the treatment fluid.

Further, the first reactant and the second reactant are also preferably selected for having a relatively low activation energy of reaction.

More particularly, at least one of the first reactant and the second reactant preferably is a water-soluble material. More preferably, both the first reactant and the second reactant each comprise a water-soluble material.

When both the first reactant and the second reactant comprise water soluble materials, preferably the first reactant comprises: a source of cations, and the second reactant comprises a source of anions. More preferably, the source of cations comprises: a source of ammonium ions; and the source of anions comprises: a source of nitrite ions. The source of ammonium ions preferably comprises an ammonium halide, and most preferably the ammonium halide comprises an ammonium chloride. Ammonium sulfate and ammonium nitrate could also be used. But ammonium nitrate is less preferable because of its explosive nature. And preferably, the source of nitrite ions comprises: an alkali nitrite, and most preferably, the source of nitrite ions comprises: sodium nitrite.

According to the presently most preferred embodiment of the invention, the preferred exothermic reaction is an acid catalyzed reaction between ammonium chloride and sodium nitrite, as shown in the following reaction (Equation 3):

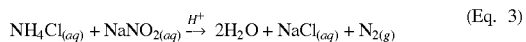

(Eq. 3)

The theoretical heat of reaction for the reaction shown in Equation 3 is −334.47 kJ/mol. It is expected that preferred concentrations would be 5-8 Molar in water of each of the reactants with an acid (for example, formic acid, acetic acid or citric acid) concentration of about 3% by weight. For these reactants at this concentration, the theoretical heat energy that can be generated can be calculated as follows: (−335 kJ/mole)(5 moles/liter)−1670 kJ/liter. The temperature in these conditions starting at standard laboratory temperature and pressure is expected to go up to about 200° F. (93° C.).

It is believed that the majority of the heat of this reaction between ammonium chloride and sodium nitrite is due to the reaction between the nitrite and ammonium ions. Thus, it is believed that other ammonium salts and other nitrite salts would be useful for an exothermic reaction. Ammonium chloride and sodium nitrite, however, are the presently most preferred reactants.

The chemical reaction shown in Equation 3 proceeds at a high rate, which should be controlled for the purposes of the present invention. Preferably, the exothermic reaction will: (a) be delayed in starting to produce heat until after a sufficient time to deliver the treatment fluid to a zone in a well to be treated; and (b) heat the treatment zone for at least about 2 hours and preferably for about 3-5 hours. Such controlled heating can impart the heat to the treatment zone or an adjacent fluid in the zone.

According to an embodiment, at least one of the reactants in a solid form to help control this exothermic reaction so that the heat of reaction energy is released over a period of time instead of as an energy spike. It should be noted that the control of the mixing of the reactants is not expected to substantially affect the total amount of heat that is generated. There are several examples of different types of solid materials that can be employed.

Preferably, at least some of at least one of the first reactant and the second reactant is suspended in a solid form in the carrier fluid. More preferably, the solid form is further adapted to help control the mixing between the first reactant and the second reactant. More preferably, the solid form is adapted to help control the mixing so that: (a) less than 50% of the total heat of the reaction is generated within any 1 hour period; and (b) greater than 50% of the total heat of the reaction is generated within a period of at most 6 hours. The purpose is to have the heat of reaction releases, whether at an even rate or in stages, so that a major spike in the release of heat energy is avoided, but that substantially all of the heat energy is released within a matter of hours. Most preferably, the heat of reaction is released over a period of about 3 to about 5 hours. For example, the solid form can comprise at least two different solid forms adapted to help control the mixing between the first reactant and the second reactant in at least two stages.

To control the rate of mixing and to help suspend the solid material in the carrier fluid, the solid form preferably substantially comprises particulate material. More preferably, the solid material is of a 20-40 mesh size.

According to one embodiment of the invention, at least one of the reactants can be embedded in a solid matrix comprising a material that helps delay the release of the reactant. The slow release of a reactant can provide a controlled reaction for heat generation.

According to another embodiment of the invention, at least one of the reactants can be encapsulated with an encapsulating material to form a solid capsule for the reactant. Again, the slow release of a reactant can provide a controlled reaction for heat generation.

Figure 2:
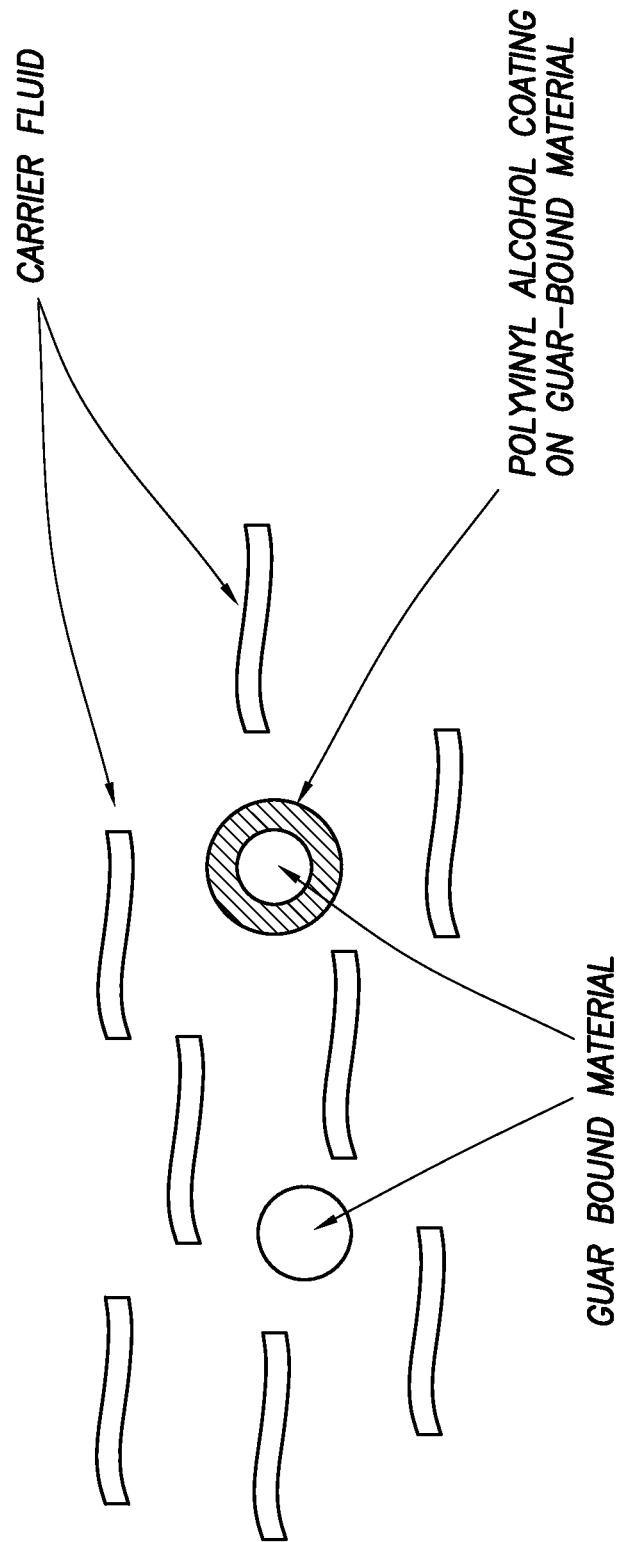
FIG. 2 is a graphical representation of a guar-bound reactant, which can be generally spherical, other shaped, or an irregular-shaped pellet, and a guar-bound reagent that also has a polyvinyl alcohol coating which dissolves in water at about 120-150° F. (49-65° C.), which can be used together in a carrier fluid to stage the release of one or more reactants.

According to still another embodiment of the invention, embedding at least one of the reactants in a solid matrix can be further combined with encapsulation of at least some of the reactant that is embedded in a solid matrix to provide additional control over the exothermic reaction. According to this embodiment, FIG. 2 is a graphical representation of a guar-bound reactant, which can be generally spherical, other shaped, or an irregular-shaped pellet, and a similar guar-bound material that also has a polyvinyl alcohol coating which dissolves in water at about 120-150° F. (49-65° C.), which can be used together in a carrier fluid to stage the release of one or more reactants.

A solid guar-bound reactant can be formed, for example, by mixing about 95% by weight of a reactant, 4% by weight dried guar gum powder, and about 1% by weight water. Preferably the substantially pure reactant is naturally in a solid form at standard temperature and pressure, for example, sodium nitrite. Guar is a polymeric material that can be hydrated. The amount of water is insufficient to substantially hydrate the guar powder, but is sufficient to make the polymeric material sticky to help bind the reactant into a matrix. The materials can be mixed together into a solid matrix, which can then be formed into small pellets. These pellets are subsequently dried in a vacuum oven at about 176° F. (80° C.) for about 12 hours to substantially reduce the moisture content and to obtain the final product. In addition to acting as a binder, the guar-bound dry matrix also acts as a vehicle for a slow release of the reactant salt into solution. The size of these pellets can be varied as desired. Preferably, the pellets vary in size from about 1 to about 10 mm across.

According to another and further example according to the invention, as shown in FIG. 2, some or all of the solid guar-bound reactant can optionally be coated or encapsulated with a material to delay the release of at least some of a guar-bound reactant, which can be used to help stage or incrementally mix the reactants to control the release of the heat of reaction.

According to yet another example, pellets of a material comprising a solid reactant, by itself or in a solid matrix, can be encapsulated to control the release of the reactant. For example, the encapsulating material can be slowly dissolvable in one of the components of the carrier fluid, or sensitive to a change in pH of an aqueous environment, or sensitive to an increase in temperature.

As an example of a material that can be used for encapsulating a reactant that is slowly dissolvable, chitosan can be used as a coating or encapsulating material. Chitosan dissolves in acetic acid which is a catalyst for the reaction. The chitosan coated material can be suspended in a viscosified acetic acid solution. The time taken by the chitosan to dissolve in an acetic acid solution would achieve delay in initiating the reaction.

As an example of a material that can be used for encapsulating a reactant that is sensitive to an increase in temperature, examples include polyvinyl alcohol or hydrogenated vegetable oil.

Any of one or more of these various techniques can be used, separately or together, to help control the release of a reactant.

Figure 3:
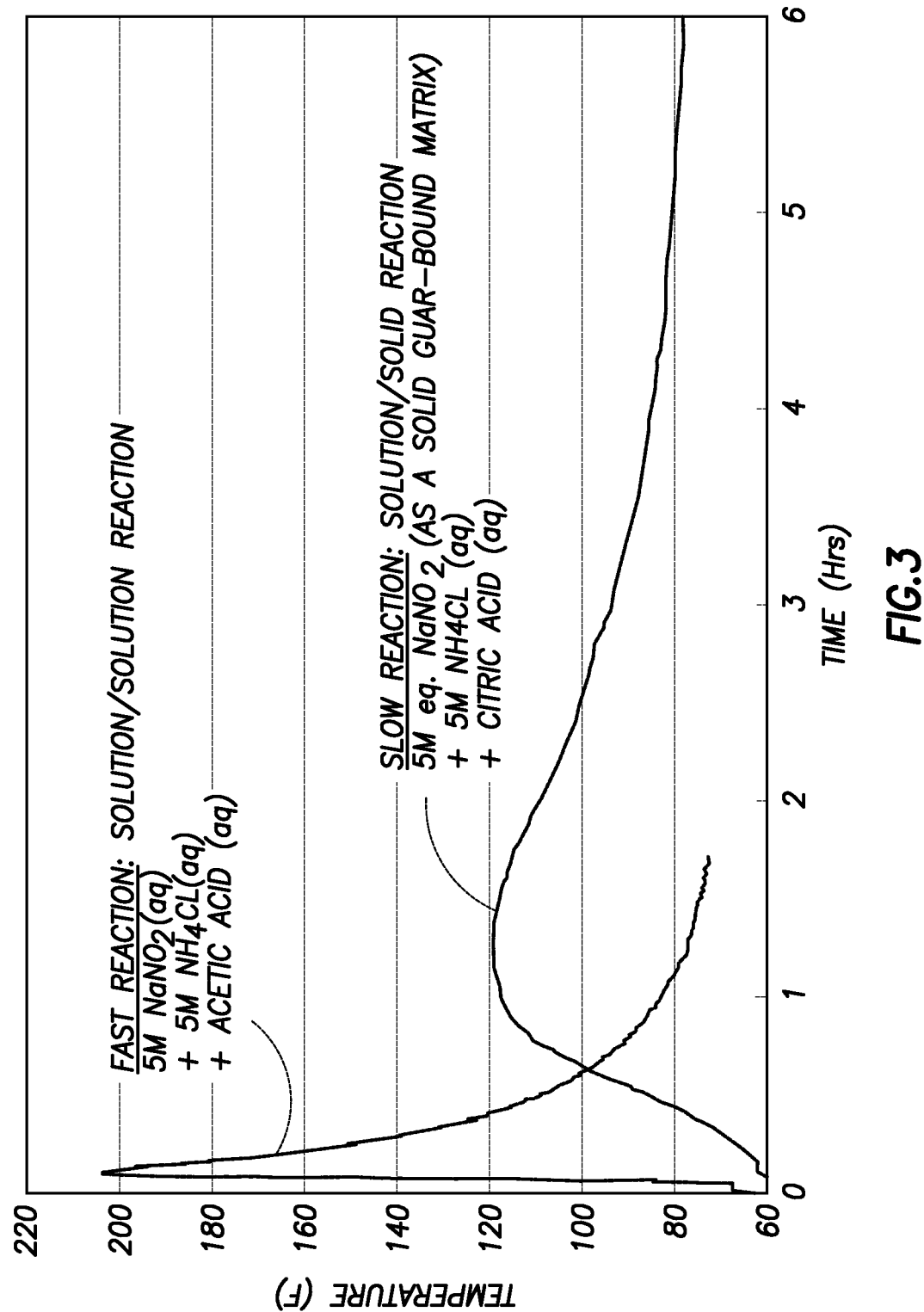
FIG. 3 is a graph showing the control in heat generation that can be achieved where a sample with one of the reactants in a solid form as a guar-bound $NaNO_2$ matrix that controls the release of nitrite ions over time for reaction with ammonium ions already dissolved in the solution.

FIG. 3 is a graph showing the control in heat generation that can be achieved where a sample with one of the reactants in a solid form as a guar-bound $NaNO_2$ matrix that controls the release of nitrite ions over time for reaction with ammonium ions already dissolved in the solution. In FIG. 3, a first line shows the change in temperature over time for an uncontrolled or fast reaction of aqueous solution phase reactions of 5M $NH_4Cl$ with 5M $NaNO_2$ in the presence of acetic acid. A second line shows the change in temperature over time for a controlled or slow reaction of an aqueous solution of $NH_4Cl$ with guar-bound $NaNO_2$ in the presence of acetic acid.

Figure 4:
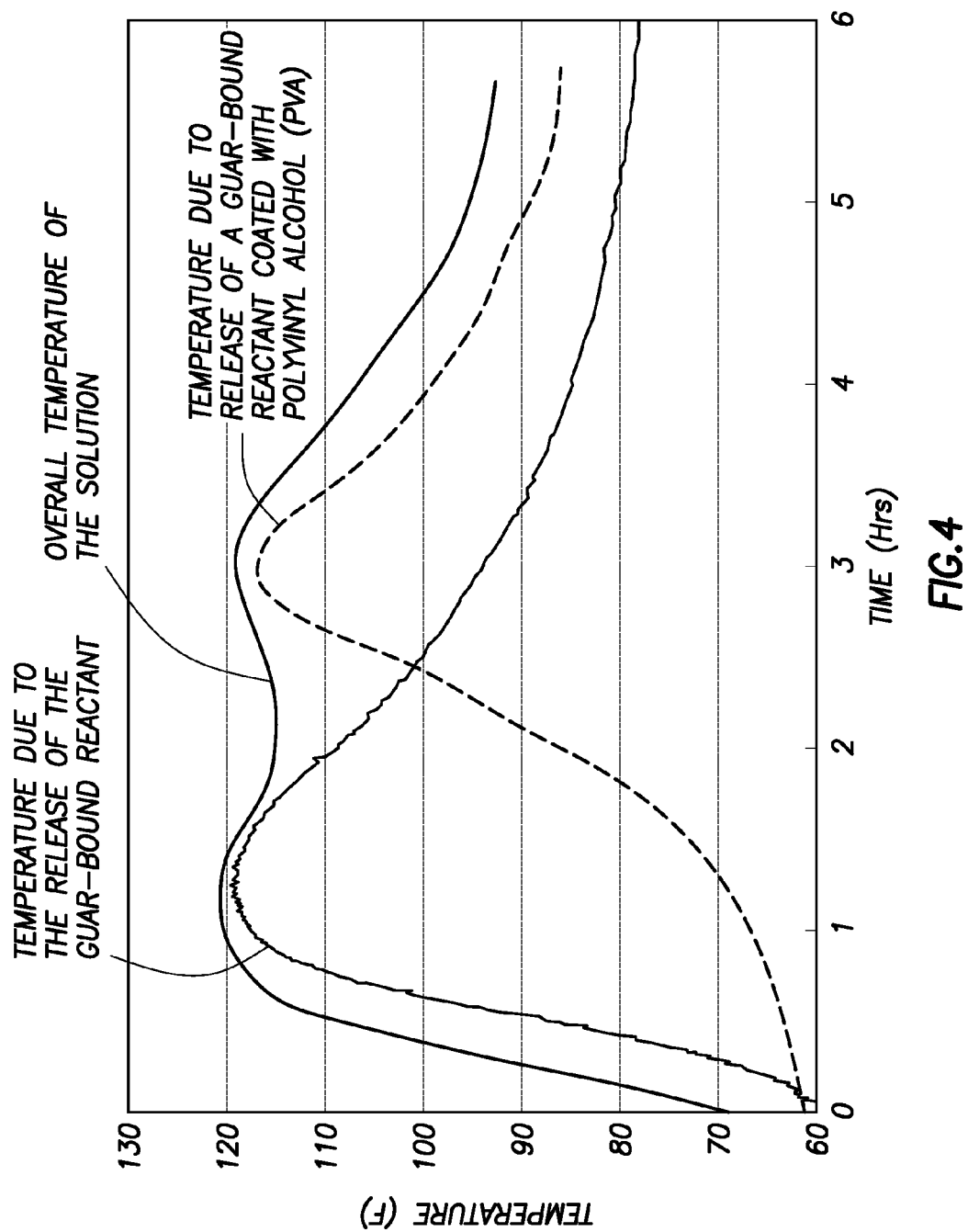
FIG. 4 is a theoretical graph showing the expected increase in temperature (° F.) over time (hours) for a staged release of solid sodium nitrite into an aqueous solution for the exothermic ammonium chloride and sodium nitrite reaction, where a first line having a single temperature peak at about 1 hour represents the increase in temperature due to the release of the guar-bound reactant, a second dashed line having a single temperature peak at about 3 hours represents the subsequent temperature triggered release of a guar-bound reactant that is coated with polyvinyl alcohol ("PVA"), and a third line having two temperature peaks at about 1 hour and about 3 hours represents the overall temperature of the solution.

FIG. 4 is a conceptual graph showing an expected combined temperature profile (° F.) over time (hours) for a staged release of solid sodium nitrite into an aqueous solution for the exothermic ammonium chloride and sodium nitrite reaction, where a first line represents the increase in temperature due to the release of the guar-bound reactant, a second line represents the subsequent temperature triggered release of a guar-bound reactant that is coated with polyvinyl alcohol ("PVA"), and a third line represents the overall temperature of the solution.

Figure 5:
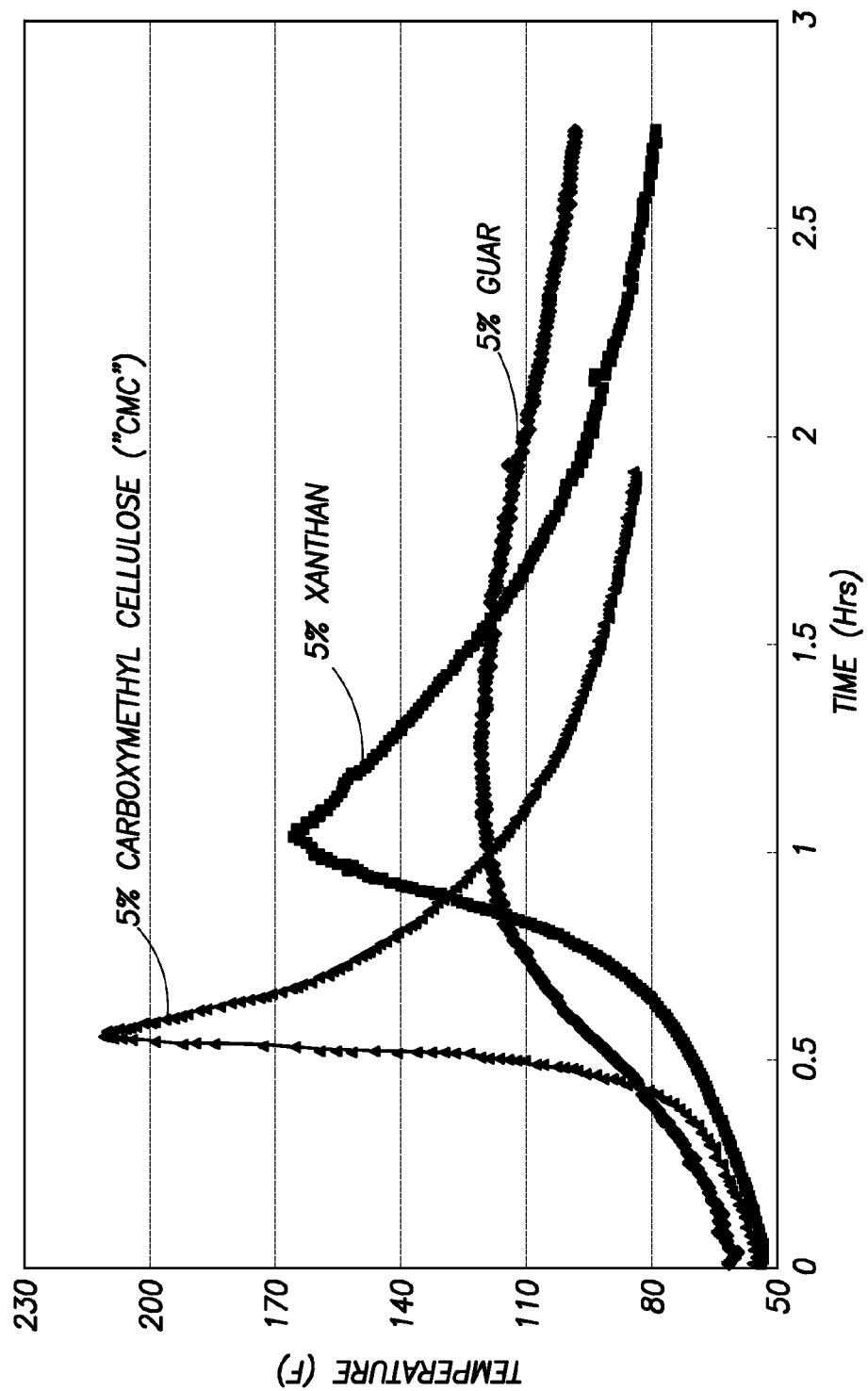
FIG. 5 is a graph showing a comparison of guar, xanthan, and carboxymethyl cellulose ("CMC") as binding materials for controlling the release of one of the reactants in a solid form as a guar-bound, xanthan-bound, or CMC-bound $NaNO_2$ matrix that controls the release of nitrite ions over time for reaction with ammonium ions already dissolved in the solution.

FIG. 5 is a graph showing a comparison of guar, xanthan, and carboxymethyl cellulose ("CMC") as binding materials for controlling the release of one of the reactants in a solid form as a guar-bound, xanthan-bound, or CMC-bound $NaNO_2$ matrix that controls the release of nitrite ions over time for reaction with ammonium ions already dissolved in the solution. As shown in FIG. 4, 5% by weight of the binder material was tested to control the release of solid form $NaNO_2$ into an aqueous solution of $NH_4Cl$ in the presence of acetic acid. While each of these materials to some degree controlled the release of the solid form $NaNO_2$ into an aqueous solution, the guar appears to provide the slowest release of the three tested materials with an incomplete release, that is, residual lumps at the end of the test period. The xanthan as binder material provided a more complete release of the solid form $NaNO_2$ into an aqueous solution for reaction with the dissolved $NH_4Cl$ in the presence of acetic acid. Finally, the CMC as a binder material delayed the release of the solid form $NaNO_2$ into an aqueous solution but did not greatly control or slow the release. It is expected that each of these binder materials, or a combination of two or more of such materials, is expected to be useful for helping to control the release of a solid form reactant into an aqueous solution for the purposes of the present invention. Guar is presently the most preferred binder material.

Figure 6:
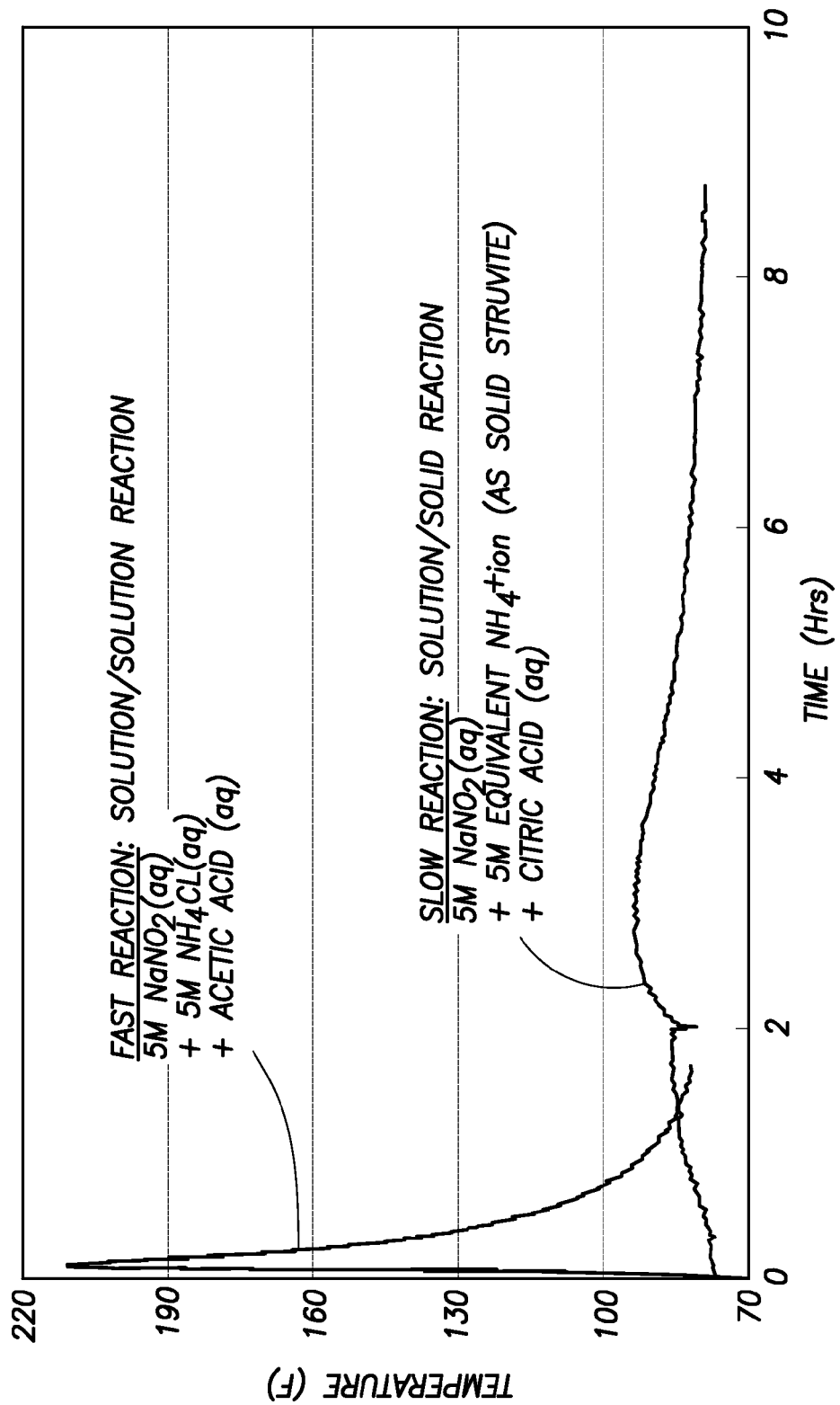
FIG. 6 is a graph showing the control in heat generation that can be achieved with one of the reactants in the form of solid, undissolved struvite with a chelating agent to help slowly dissolve the struvite and thereby release ammonium ions for reaction with $NaNO_2$ already dissolved in the solution.

According to another embodiment, undissolved solid struvite is used in place of ammonium chloride in the reaction shown above in Equation 3. Struvite is a magnesium ammonium phosphate and acts as a source of ammonium ions. Magnesium ammonium phosphate ($MgNH_4PO_4.0.6H_2O$) is a white powder, density 1.71, melting point (decomposes to magnesium pyrophosphate, $Mg_2P_2O_7$), soluble in acids, insoluble in alcohol and water. Hawley's Condensed Chemical Dictionary, $14^{th}$ Edition, Ed. Richard J. Lewis, 2001, page 237. As struvite is known to be insoluble in water, however, but soluble in acidic solutions and the dissolution of struvite is also known to be enhanced by the presence chelating agents (for example, citric acid, sodium salts of ethylenediamine tetraacetic acid ("EDTA")), which bind onto magnesium thereby breaking the solid matrix. By controlling the concentration of the chelating agent, it is possible to control the dissolution of struvite and hence to control the rate of heat generation. FIG. 6 is a graph showing the control in heat generation that can be achieved with one of the reactants in the form of solid, undissolved struvite and a chelating agent to slowly dissolve the struvite and thereby release ammonium ions for reaction with $NaNO_2$ already dissolved in the solution.

Figure 7:
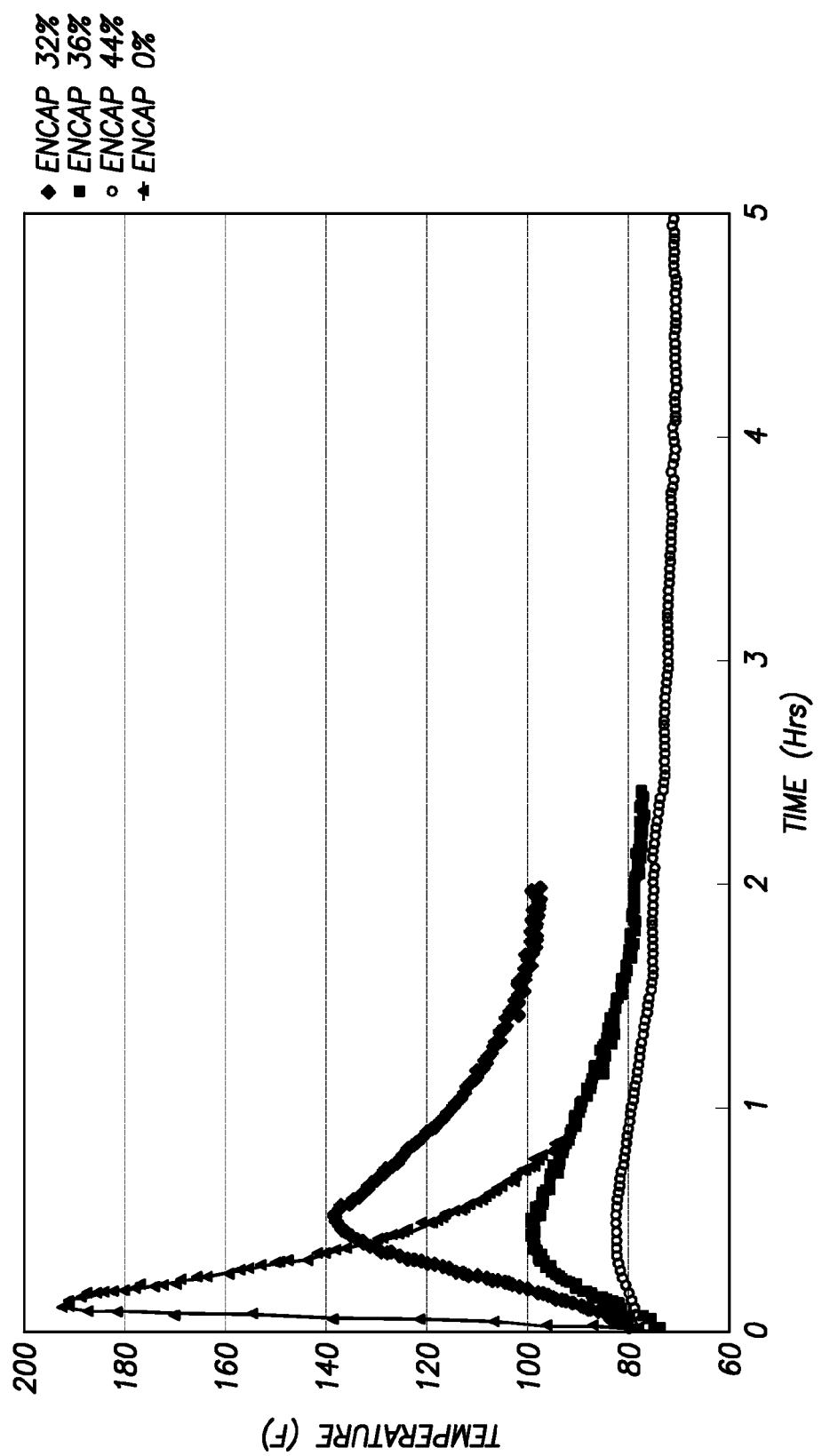
FIG. 7 is a graph showing the control in heat generation that can be achieved where ammonium chloride is first impregnated on diatomaceous earth and subsequently coated with a resin-based slow release agent that controls the release of ammonium ions over time for reaction with nitrite ions already dissolved in the solution.

According to yet another embodiment of the invention, the $NH_4Cl$ is bound into a solid form. More particularly, in this embodiment the $NH_4Cl$ is impregnated on diatomaceous earth and subsequently coated with a resin-based slow release agent. The particle size was 20-40 mesh. FIG. 7 is a graph showing the control in the release of ammonium ions over time for reaction with nitrite ions already dissolved in a test solution in the presence of acetic acid, which helps control the timing and rate of heat generation. In FIG. 7, a first line plotted on the graph shows the change in temperature over time for an uncontrolled or fast reaction of aqueous solution phase reactions of 5M $NH_4Cl$ with 5M $NaNO_2$ in the presence of acetic acid reaching a maximum temperature of about 190° F. (88° C.). A second line shows the change in temperature over time for a controlled or slow reaction of a 32% by weight encapsulation of $NH_4Cl$ with aqueous dissolved $NaNO_2$ in the presence of acetic acid reaching a maximum temperature of about 140° F. (60° C.). A third line shows the change in temperature with a 36% by weight encapsulation of $NH_4Cl$ reaching a maximum temperature of about 100° F. (38° C.), and a fourth line shows the change in temperature with a 44% by weight encapsulation of $NH_4Cl$ reaching a maximum temperature of about 80° F. (27° C.).

Figure 8:
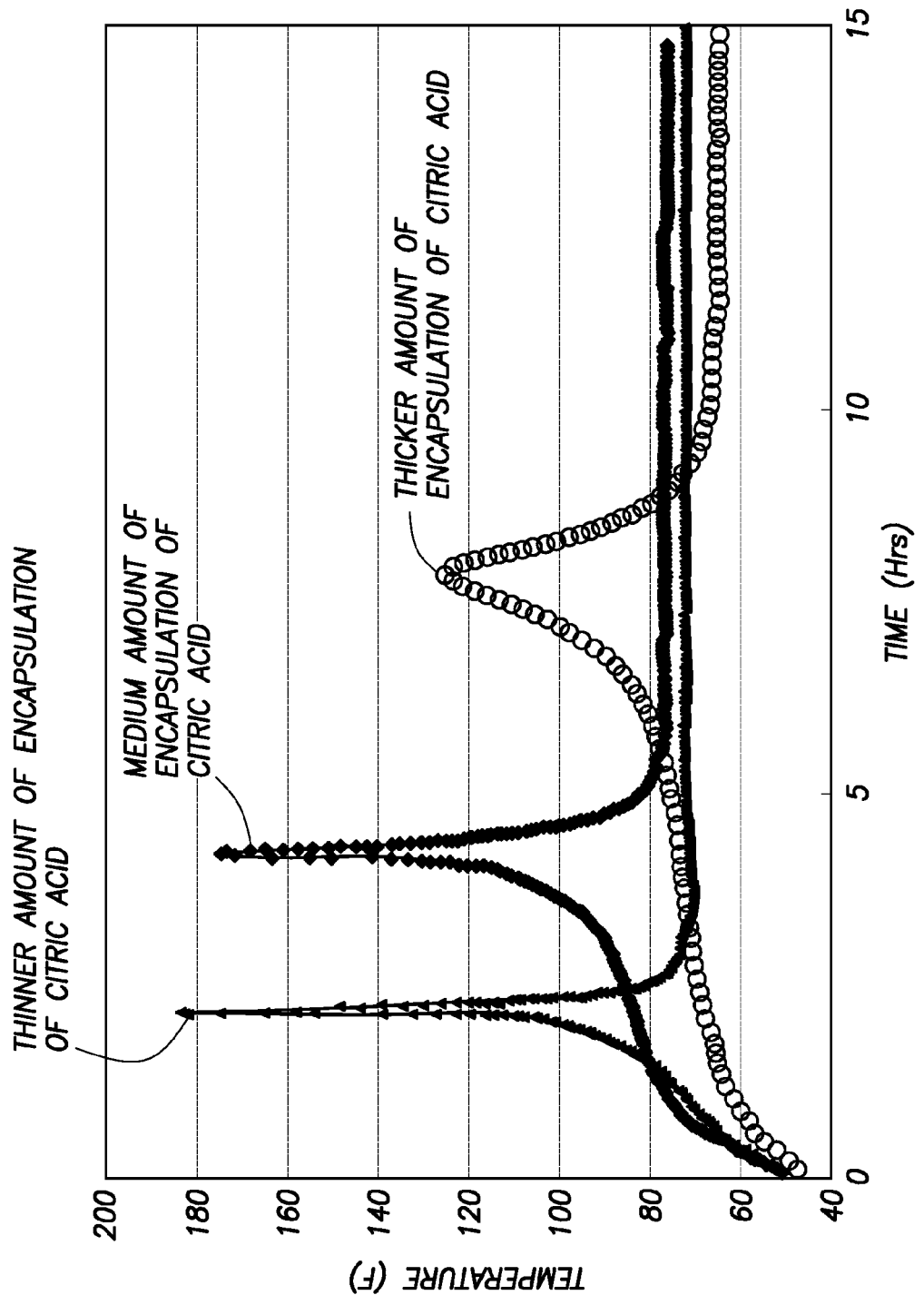
FIG. 8 is a graph of a delayed exothermic reaction process wherein an exothermic reaction is delayed before it begins by a delayed release acid system but the subsequent reaction is not otherwise controlled.

FIG. 8 is a graph of a delayed exothermic reaction process wherein an exothermic reaction is delayed before it begins by a delayed release acid system. One example of a technique that can be used to delay the reaction includes using a neutral or alkaline solution and delaying the release of an acid. Another example of a technique for delaying the start of includes encapsulating one or both of the reagents for an exothermic reaction to delay the initial release of the reagent or reagents.

The exothermic reaction according to Equation 3 also produces nitrogen gas. When a viscosified fluid is used to carry the reactants, the generated nitrogen gas can produce a foamed fluid. It is believed that the foamed fluid can help provide a margin for safety in controlling the release of pressure generated by the nitrogen gas.

Depending on the selection of the first reactant and the second reactant, the reaction may be assisted by or require a catalyst for an exothermic chemical reaction between the first reactant and the second reactant. When helpful or necessary, the step of forming a treatment fluid preferably further comprises: forming a treatment fluid further comprising a catalyst for an exothermic chemical reaction between the first reactant and the second reactant.

In the case of a reaction requiring a catalyst, the method advantageously can further comprise the step of: delaying the release of the catalyst to help delay the beginning of any substantial reaction between the first reactant and the second reactant. This step of delaying the release of the catalyst can be an independent and additional approach to controlling the beginning of the release of the heat of reaction, whereas having at least some of one of the first and second reactants in a solid form is a separate and independent approach to controlling when the heat of reaction is released after the release of a catalyst allows the start of the reaction. For example, the release of the catalyst may occur after some of one of the reactants has been released from its solid form to become available for reaction, such that a small initial spike in heat energy is allowed followed by a more sustained or stepped release of heat energy depending on the nature of the solid form of one or both of the reactants.

The encapsulating or embedding material for delaying the release of acid can be any material that melts or dissolve in the carrier fluid upon reaching a certain temperature to release the acid. Further, the dissolution of the polymeric material would be expected to increase with increasing temperature.

By way of example, the polymeric material can be a material that releases the encapsulated reactant upon reaching or exceeding a specific temperature. In such case, for example, the polymeric material can be selected to release a reactant at or above a temperature of 120° F. (49° C.), for example, polyvinyl alcohol. Or a polymeric material can be selected that releases the encapsulated reactant at a temperature above 150° F. (65° C.). Examples of encapsulating materials that have low melting points in these ranges also include vegetable oil based encapsulating materials, such as those described in U.S. Pat. No. 6,153,236 issued Nov. 28, 2000 to Balchem Corporation.

More particularly, for example, when the first and second reactants are ammonium ion and nitrite ion, the catalyst is preferably an acid, and more preferably a carboxylic acid. Most preferably, the acid is selected from the group comprising: acetic acid, citric acid, lactic acid, and any combination thereof in any proportion. For this particular reaction, the acid should be effective to make the pH of the water in the carrier fluid less than or equal to about 5.5. Further, in this case the method preferably further comprises the step of: delaying the release of the acid to help delay the beginning of any substantial reaction between the first reactant and the second reactant. For example, the step of delaying the release of the acid can comprise: including a delayed release acid in the treatment fluid.

The specific solid form of a reactant can be used to control the mixing of the reactants, either the timing of the mixing in stages of release or the rate of a steady release of at least one of the reactants for a controlled steady rate of mixing and reaction, or any combination of such objectives.

For example, according to one embodiment of the invention, the solid form for a reactant comprises: having at least some of at least one of the first reactant and the second reactant is embedded in a solid matrix with a polymeric material.

According to another embodiment of the invention, the solid form comprises for a reactant comprises: having at least some of at least one of the first reactant and the second reactant is encapsulated with a polymeric material capable of helping to control the release of the reactant.

For embedding a reactant in a solid matrix, the embedding material is preferably a polymeric material. More particularly, the polymeric material preferably comprises a biopolymeric material or a derivative of a biopolymeric material. More preferably, the biopolymeric material is selected from the group consisted of hydroxyl alkyl cellulose, xanthan, diutan, guar gum, chitosan, in any combination and in any proportion.

Preferably, the polymeric material is a material that can be hydrated. Thus, when forming a solid matrix, a small proportion of water is added. Preferably the water is an insufficient proportion to substantially hydrate the polymeric material, but is sufficient to make the polymeric material sticky to help bind the reactant into a matrix. The materials can be mixed together into a solid matrix, which can then be formed into small pellets. These pellets are subsequently dried, for example, in a vacuum oven at about 176° F. (80° C.) for about 12 hours to obtain the final product. In addition to acting as a binder, the polymer-bound dry matrix also acts as a vehicle for a slow release of the reactant salt into solution. The size of these pellets can be varied as desired. Preferably, the pellets vary in size from about 1 to about 10 mm across. If desired, the uniformity of pellet size can be controlled by screening techniques.

For encapsulating a reactant or embedding a reactant in a matrix, the encapsulating or embedding material preferably comprises a water-soluble polymeric material. More preferably, for example, the water-soluble the polymeric material is selected from the group consisting of polyvinyl alcohols, polyvinyl alcohol copolymers, partially hydrolyzed polyvinyl acetate, polyvinyl pyrrolidone, alkyl celluloses, ethers and esters of alkyl cellulosics, hydroxy alkyl, carboxy methyl cellulose sodium, dextrin, maltodextrin, water soluble polyacrylates, water soluble polyacrylamides, acrylic acid/maleic anhydride copolymers, and any combination thereof in any proportion. Based on the teachings of this invention, a person of skill in the art will be able to select particularly appropriate polymeric materials and an appropriate physical solid form to achieve a release of reactant after a desired time or after a desired temperature.

Alternatively, for encapsulating a reactant or embedding a reactant in a matrix, the encapsulating or embedding material can be sensitive to temperature. For example, polyvinyl alcohol or hydrogenated vegetable oil can be used.

Thus, the encapsulating or embedding material can be any material that melts or dissolve in the carrier fluid to release a reactant for an exothermic reaction. Further, the dissolution of the polymeric material would be expected to increase with increasing temperature.

Further, when one portion of one of the reactants is encapsulated in a first polymeric material that releases the reactant at a lower temperature and another portion of the reactant is encapsulated in a second polymeric material that releases the reactant at a higher temperature, it is possible to control the mixing of the reactants in stages. This principle can be extended to release successive portions of a reactant as the temperature of the treatment fluid increases with each successive release of reactants to generate some of the available heat of reaction for all the reactant material in the carrier fluid.

By way of further example, the polymeric material can be selected to dissolve in an acidic solution, wherein the carrier fluid comprises water at a neutral or alkaline pH; and wherein the treatment fluid further comprises a delayed release acid. Upon the delayed release of the acid, the pH of the water in the carrier fluid would become acidic, which can be used to begin to release some of one of the reactants into the carrier fluid. For example, such a polymeric material is chitosan, alone or in combination with sodium alginate, which material would dissolve in an acetic acid solution. Other examples include synthetic, cationic polymers.

According to yet another embodiment of the invention, the solid form comprises: having at least some of at least one of the first reactant and the second reactant in a solid form that is insoluble in neutral water; and wherein the treatment fluid comprises: an agent to increase the solubility of such reactant in water. A specific example of such an embodiment is when the first reactant comprises: magnesium ammonium phosphate in solid form that is soluble in water at a very slow rate of dissolution, and the second reactant comprises a source of nitrite ions; and wherein the agent to increase the rate of dissolution of the magnesium ammonium phosphate comprises a chelating agent. In this embodiment, the chelating agent is preferably selected from the group consisting of: citric acid, alkali salts of ethylenediaminetetraacetic acid ("EDTA"), nitrilotriacetic acid ("NTA"), and any combination thereof in any proportion.

In addition to the example of an exothermic reaction between ammonium ion and nitrite ion, the Fenton's Reaction has been known since 1894 and is one of the most powerful oxidizing reactions available. The Fenton's Reaction is of interest because it is highly exothermic.

The Fenton's Reaction involves hydrogen peroxide and a ferrous iron catalyst (Equation 4). The peroxide is broken down into a hydroxide ion and a hydroxyl free radical. The hydroxyl free radical is the primary oxidizing species and can be used to oxidize and break apart organic molecules.

$$H_2O_2 + Fe^{2+} \rightarrow Fe^{3+} + HO^- + HO. \quad \text{(Eq. 4)}$$

Other similar exothermic reactions with hydrogen peroxide and metal ions are also contemplated to produce oxidizing species, such as the reaction of hydrogen peroxide and copper ions.

It is well known that organic compounds can be easily oxidized. One primary advantage of the Fenton's Reaction is that it does not produce further organic compounds or inorganic solids such as permanganate and dichromate, since there is no carbon in the peroxide.

If the reaction is carried to completion, then ultimately the organic molecules break down into $CO_2$ and water, which are the normal end products of a combustion reaction. Also similar to a regular combustion reaction, organic destruction by the Fenton's Reagent is highly exothermic. Unlike combustion, however, Fenton's Reaction is associated with foaming, often very heavy and thick in the early parts of the reaction, especially for large compounds with high amounts of carbon.

However, there are organic species that show resistance to oxidation by the Fenton's Reaction. Small chlorinated alkanes, n-paraffins, and short-chain carboxylic acids, compounds that are typical oxidation products of larger molecules, seem to resist further fragmentation by the Fenton's Reaction. Nevertheless, it is expected that Fenton's Reaction can be used to oxidize hydrocarbon as one of the reactants to generate heat included in the carrier fluid. The heat of this reaction would be expected to be limited by the amount of hydrogen peroxide and ferrous iron used in the treatment fluid.

Another example of a highly exothermic reaction is the reaction of ammonia with carbon dioxide to form urea, $H_2NC(O)NH_2$, a water-soluble compound made by many organisms, including humans, to eliminate nitrogen, according to the following reaction (Equation 5):

$$2NH_{3(g)} + CO_{2(g)} \rightarrow H_2NC(O)NH_{2(s)} + H_2O_{(l)} \quad \text{(Eq. 5)}$$

The standard enthalpies of formation (H°f) for ammonia, carbon dioxide, urea, and water are −46.1, −393.5, −333.0, and −285.8 kJ/mole, respectively. Accordingly, the theoretical enthalpy change for the reaction ("Hrxn")=H°f(H$_2$O(l))+H°f(H$_2$NC(O)NH$_2$(s))-2H°f(NH$_3$(g))-H°f(CO$_2$(g))=(−285.8 kJ)+(−333.0 kJ)−(−92.2 kJ)−(−393.5 kJ)=−133.1 kJ/mole (based on the amount of carbon dioxide).

Another highly exothermic class of reactions is Grignard reactions, for which the heat of reaction is typically in the range of about −200 kJ/mole to about −250 kJ/mole.

Carrier Fluid

Depending on the reagents selected to generate heat, which may require an aqueous solution to react, the carrier fluid for the reactants preferably comprises water. The water can be selected from the group consisting of: seawater; brackish water; freshwater; and any combination thereof in any proportion. The carrier fluid can comprises a hydrocarbon that is a liquid at Standard Laboratory Conditions. More preferably, depending on the reagents selected to generate heat, which may require an aqueous solution, the carrier fluid is an emulsion of water and hydrocarbon. Most preferably, the hydrocarbon in the carrier fluid is selected from the group consisting of: crude oil, kerosene, an aromatic solvent, and any combination thereof in any proportion.

The carrier fluid preferably comprises a viscosifying agent. The viscosifying agent helps suspend a solid particulate material in the carrier fluid. For example, the viscosifying agent can comprise: a water-soluble polymeric material. More preferably, the viscosifying agent may be a polysaccharide selected from the group consisting of: guar, hydroxylalkylguar, carboxyalkylhydroxyalkylguar, carboxyalkylcellulose, carboxyalkylhydroxyalkyl-cellulose, xanthan, derivatives of any of the foregoing, and any combination thereof in any proportion. The viscosifying agent can further comprise a crosslinking agent. Moreover, the treatment fluid can further comprise a breaker for the viscosifying agent.

Most preferably, the viscosifying agent comprises: a xanthan with additives that help the viscosifying agent withstand high salt content in the carrier fluid and an acidic pH of the type disclosed in US Patent Publication No. 2004/0214728, published Oct. 28, 2004, having for named inventors Robert S. Taylor, Gary P. Funkhouser, Michael A. McCabe, and B. Raghava Reddy, which is incorporated herein by reference in its entirety.

In a method according to the invention wherein the exothermic reactants and the treatment chemical are introduced in separate treatment fluids, the carrier fluid for the separate treatment fluids can be the same or different.

Other Fluid Additives

A fluid can contain additives that are commonly used in oil field applications, as known to those skilled in the art. These include, but are not necessarily limited to, brines, inorganic water-soluble salts, salt substitutes (such as trimethyl ammonium chloride), pH control additives, surfactants, breakers, breaker aids, oxygen scavengers, alcohols, scale inhibitors, corrosion inhibitors, hydrate inhibitors, fluid-loss control additives, oxidizers, chelating agents, water control agents (such as relative permeability modifiers), consolidating agents, proppant flowback control agents, conductivity enhancing agents, clay stabilizers, sulfide scavengers, fibers, nanoparticles, bactericides, and combinations thereof. Of course, additives should be selected for not interfering with the purpose of the treatment fluid.

Method of Treating a Well

According to another embodiment of the invention, a method of treating a well, is provided, the method including the steps of: forming a one or more treatment fluids according to the invention; and introducing the one or more treatment fluids into the well.

A fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In certain embodiments, the preparation of a fluid can be done at the job site in a method characterized as being performed "on-the-fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a fluid into a well is within a relatively short period after forming the fluid, for example, less within 30 minutes to one hour. More preferably, the step of delivering the fluid is immediately after the step of forming the fluid, which is "on-the-fly."

It should be understood that the step of delivering a fluid into a well can advantageously include the use of one or more fluid pumps.

In an embodiment, the step of introducing is at a rate and pressure below the fracture pressure of the treatment zone.

In an embodiment, the step of introducing comprises introducing under conditions for fracturing a treatment zone. The fluid is introduced into the treatment zone at a rate and pressure that are at least sufficient to fracture the zone.

After the step of introducing a fluid, a method according to the invention can additionally include a step of allowing time for the desired chemical treatment in a well at the desired temperature. For example, the portion of the well or the treatment zone can be shut-in for a required treatment time.

After a treatment according to the invention, the one or more downhole fluids can be flowed back to the surface. In an embodiment, the step of flowing back is within 24 hours of the step of introducing. In another embodiment, the step of flowing back is within 12 hours of the step of introducing.

Preferably, after any such treatment according to the invention, a step of producing hydrocarbon from the subterranean formation is the desirable objective.

CONCLUSION

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (that is, pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method for treating a treatment zone of a well, the method comprising the steps of:
   (A) forming a first treatment fluid comprising:
      (i) a first carrier fluid; and
      (ii) a first reactant and a second reactant, wherein the first reactant and second reactant are selected for being capable of reacting together in an exothermic chemical reaction, and wherein the first and second reactant are in at least sufficient concentrations in the carrier fluid to generate a theoretical heat of reaction of at least 500 kJ/liter of the treatment fluid;
      wherein the volume of the first treatment fluid is equal to or greater than about 10 $m^3$;
   (B) forming a second treatment fluid comprising:
      (i) a second carrier fluid; and
      (ii) a treatment chemical dissolved or suspended in the second carrier fluid, wherein the treatment chemical comprises a chelating agent selected for forming chemical bonds with or for breaking of chemical bonds in a substance of a material in the treatment zone of the well;
   (C) introducing the first treatment fluid and the second treatment fluid in any sequential order into the treatment zone of the well, wherein the treatment zone comprises an acid-sensitive formation and the treatment zone is at a temperature of 250° F. (121° C.) or lower prior to introducing the first and second treatment fluids;
   (D) allowing the chelating agent to chemically react with an acid-sensitive formation or inorganic scale in the treatment zone; and
   (E) introducing a treatment fluid different from the first and second treatment fluids into the treatment zone within less than an hour of step (C),
   thereby, without requiring a shut in of more than one hour between step (C) and step (E), increasing permeability of the acid-sensitive formation or removing inorganic scale in the treatment zone.

2. The method according to claim 1, wherein the treatment zone of the well is a sandstone formation.

3. The method according to claim 1, wherein the chelating agent is selected from the group consisting of: glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-methyliminodiacetic acid, iminodiacetic acid, N-(2-acetamido)iminodiacetic acid, hydroxymethyl-iminodiacetic acid, 2-(2-carboxyethylamino)succinic acid, 2-(2-carboxymethylamino)succinic acid, diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof.

4. The method according to claim 1, wherein the first and second treatment fluids are not heated prior to the step of introducing.

5. The method according to claim 1, wherein the contact time of the first and second treatment fluids with the treatment zone of the well is controlled to be shorter than would be required for an otherwise treatment without the first fluid.

6. The method according to claim 1, wherein the first reactant comprises ammonium ions and the second reactant comprises nitrite ions.

7. The method according to claim 1, wherein at least some of at least one of the first reactant and the second reactant is suspended in a solid form in the carrier fluid, and the solid form is further adapted to help control the mixing between the first reactant and the second reactant.

8. The method according to claim 1, wherein the first and second treatment fluids are introduced adjacent to each other without an intermediate treatment fluid between the first and second treatment fluids.

9. The method according to claim 1, wherein the first treatment fluid and the second treatment fluid are alternatingly introduced into the well.

10. The method according to claim 9, wherein a total volume of the first treatment fluid that is alternatingly introduced is greater than about 16 $m^3$.

11. The method according to claim 1, wherein the treatment zone is at a temperature of 220° F. (104° C.) or lower prior to introducing the first and second treatment fluids.

* * * * *